United States Patent [19]

Nanami et al.

[11] Patent Number: 5,550,385

[45] Date of Patent: Aug. 27, 1996

[54] METHOD AND APPARATUS FOR DETECTING ABNORMAL IMAGE PATTERNS

[75] Inventors: Shoji Nanami; Hiroaki Yasuda, both of Kanagawa-ken, Japan

[73] Assignee: Fuji Photo Film Co., Ltd, Kanagawa, Japan

[21] Appl. No.: 508,187

[22] Filed: Jul. 27, 1995

[30] Foreign Application Priority Data

Oct. 14, 1994 [JP] Japan ..................... 6-249612

[51] Int. Cl.$^6$ ..................................... G01N 23/04
[52] U.S. Cl. ........................... 250/584; 250/586
[58] Field of Search ..................... 250/584–587

[56] References Cited

U.S. PATENT DOCUMENTS

| | | |
|---|---|---|
| 4,346,295 | 8/1982 | Tanaka et al. |
| 4,703,537 | 11/1987 | Yamamoto et al. ............ 15/102 |
| 4,920,267 | 4/1990 | Nagata et al. |
| 5,151,593 | 9/1992 | Saotome ...................... 250/585 |
| 5,231,574 | 7/1993 | Agano . |
| 5,477,059 | 12/1995 | Arakawa ...................... 250/586 |
| 5,483,081 | 1/1996 | Hosoi ......................... 250/586 |

*Primary Examiner*—Carolyn E. Fields
*Attorney, Agent, or Firm*—Sughrue, Mion, Zinn, Macpeak & Seas

[57] ABSTRACT

A stimulable phosphor sheet, on which a radiation image has been stored, is exposed to stimulating rays, which cause it to emit light in proportion to the amount of energy stored thereon during its exposure to radiation. The light emitted by the front surface of the stimulable phosphor sheet and the light emitted by the back surface of the stimulable phosphor sheet, are detected photoelectrically. The image signal components of the two image signals are subtracted from each other, which represent corresponding picture elements on the front and back surfaces of the stimulable phosphor sheet, difference values being thereby obtained. A judgment is made as to whether each of the difference values falls or does not fall within a predetermined range. In cases where a difference value is judged as being outside the predetermined range, it is determined that an abnormal signal component is contained in at least either one of the two image signals.

8 Claims, 6 Drawing Sheets

METHOD AND APPARATUS FOR DETECTING ABNORMAL IMAGE PATTERNS

BACKGROUND OF THE INVENTION

1. Field of the Invention

This invention relates to a method and apparatus for detecting an abnormal image pattern, wherein an abnormal image pattern, which appears in a reproduced visible image due to dust, a flaw, or the like, located on a surface of a stimulable phosphor sheet, or due to a noise component, is detected from image signals, which are obtained from an image read-out operation carried out on the stimulable phosphor sheet.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, an X-ray image is recorded on an X-ray film having a small gamma value chosen according to the type of image processing to be carried out, the X-ray image is read out from the X-ray film and converted into an electric signal (i.e., an image signal), and the image signal is processed and then used for reproducing the X-ray image as a visible image on a photocopy, or the like. In this manner, a visible image having good image quality with high contrast, high sharpness, high graininess, or the like, can be reproduced.

Further, it has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then scanned with stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then processed and used for the reproduction of the radiation image of the object as a visible image on a recording material.

As a method for photoelectrically detecting light emitted by a stimulable phosphor sheet, a method for detecting light emitted by two surfaces of a stimulable phosphor sheet has been proposed in, for example, U.S. Pat. No. 4,346,295. With the proposed method for detecting light emitted by two surfaces of a stimulable phosphor sheet, two photoelectric read-out means are located on opposite sides of the stimulable phosphor sheet. The two surfaces or only one surface of the stimulable phosphor sheet is scanned with the stimulating rays, and the light emitted by the two surfaces of the stimulable phosphor sheet is photoelectrically detected by the two photoelectric read-out means. With the proposed method for detecting light emitted by two surfaces of a stimulable phosphor sheet, a single radiation image is stored on the stimulable phosphor sheet, and the light emitted by two surfaces of the stimulable phosphor sheet is detected on the two sides of the stimulable phosphor sheet. Therefore, the efficiency, with which the light emitted by the stimulable phosphor sheet is guided and detected, can be kept high, and a high signal-to-noise ratio can be obtained.

With the method for detecting light emitted by two surfaces of a stimulable phosphor sheet, which has been proposed in U.S. Pat. No. 4,346,295, a stimulable phosphor layer is overlaid on a surface of a transparent substrate, and a stimulable phosphor sheet is thereby formed. The stimulable phosphor sheet, on which a radiation image has been stored, is placed on a transparent holder, and two photoelectric read-out means are respectively located above and below the holder. Specifically, the light emitted from the front surface of the stimulable phosphor sheet is detected by the photoelectric read-out means, which is located above the holder. Also, the light emitted from the back surface of the stimulable phosphor sheet is detected by the photoelectric read-out means, which is located below the holder.

When a radiation image is recorded on a recording media, such as a stimulable phosphor sheet or X-ray film, if dust clings to the surface of the recording media, the radiation irradiated to the recording media will be blocked by the dust. Therefore, when a visible image is reproduced from the image signal, which has been obtained from the recording media carrying a radiation image thus recorded, a white dot-like pattern occurs as an artifact in the reproduced visible image at a portion corresponding to the part of the surface of the recording media, to which the dust clung. Also, in particular, in the radiation image recording and reproducing system in which a stimulable phosphor sheet is used, when the stimulable phosphor sheet, on which the radiation image has been stored, is exposed to stimulating rays, and the radiation image is thereby read out from the stimulable phosphor sheet, the stimulating rays are blocked by dust clinging to the stimulable phosphor sheet. As a result, a white dot-like pattern occurs in the reproduced visible image. Further, in the radiation image recording and reproducing system, if flaws are present on the surface of the stimulable phosphor sheet, the stimulating rays will be scattered by the portion at which the flaws are present. As a result, a white dot-like pattern occurs in the reproduced visible image.

In cases where the reproduced visible image is used in making a diagnosis of an illness of a human body, or the like, the aforesaid white dot-like pattern has very detrimental effects. Specifically, for example, in cases where a radiation image of the mamma, or the like, is recorded and reproduced, a calcium salt, which has deposited in a living body, appears as a white dot-like pattern, and the white dot-like pattern due to the deposition of the calcium salt (i.e. the calcification) is utilized in finding a cancer, or the like. Therefore, if the white dot-like pattern due to the calcification and the white dot-like pattern due to dust or flaws described above cannot be discriminated from each other, an error will occur in making a diagnosis. The sizes of the white dot-like patterns due to dust or flaws will vary in accordance with the sizes of the dust or the flaws. However, actually, it often occurs that the sizes of the white dot-like patterns due to dust or flaws are approximately equal to the sizes of white dot-like patterns due to the calcification.

In order for the aforesaid problems to be prevented from occurring, the clinging of dust to a recording medium or the occurrence of flaws in the recording medium have heretofore been prevented with various methods. For example, a method for removing dust, which has clung to a stimulable phosphor sheet, by using a cleaning roller has been proposed in, for example, U.S. Pat. No. 4,703,537.

Also, a method for detecting an abnormal image pattern has been proposed by the applicant in U.S. Pat. No. 5,231,574. With the proposed method, specific image signal components, which take values smaller than a predetermined threshold value, are found from an image signal, which is made up of a series of image signal components representing picture elements in an image. Thereafter, the number of picture elements, which are adjacent to one another and which the specific image signal components represent, is counted. In cases where the number of such picture elements is not larger than a predetermined value, it is regarded that the specific image signal components are artifact signal components. In this manner, a white dot-like pattern due to the calcification and a white dot-like pattern, which is an artifact due to dust, flaws, or the like, are discriminated from each other.

Stimulable phosphor sheets have a very high sensitivity. Therefore, a stimulable phosphor sheet also stores energy from radiation delivered by radioactive isotopes, such as $^{226}$Ra and $^{40}$K, which are contained in a trace amount in the stimulable phosphor of the stimulable phosphor sheet, or energy from environmental radiation, such as cosmic rays and radiation delivered by radioactive isotopes, which are contained in paints on indoor walls, or the like. In cases where the operations for recording and reproducing a radiation image are carried out by use of the stimulable phosphor sheet, on which energy from such radiation has been stored, a black dot-like pattern will occur in a reproduced visible image. The black dot-like pattern adversely affects the image quality of the reproduced visible image.

If a noise component, which forms the aforesaid black dot-like pattern, can be detected from the image signal obtained from the aforesaid radiation image read-out operation, it will become possible to prevent the black dot-like pattern from occurring in the reproduced visible radiation image by carrying out various processes on the image signal in order to eliminate the noise component.

Accordingly, in U.S. Pat. No. 4,920,267, the applicant proposed a method for detecting noise in image signals. The proposed method comprises the steps:

i) comparing the value of an image signal component a, which represents each remark picture element A, with values $(b_1+T_1)$, $(b_2+T_2)$, ..., $(b_n+T_n)$, which are obtained by adding predetermined values $T_1, T_2, ..., T_n$ respectively to the values of image signal components $b_1, b_2, ..., b_n$ representing a plurality of picture elements $B_1, B_2, ..., B_n$ located in the vicinity of the remark picture element A, and ii) recognizing that noise is contained in the image signal component a in the case where the image signal component a takes a value larger than every one of the values $(b_1+T_1)$, $(b_2+T_2)$, ..., $(b_n+T_n)$. In this manner, a noise component is accurately detected from the image signal, which has been obtained from the radiation image read-out operation carried out on a stimulable phosphor sheet.

Also, in cases where the operation for detecting light emitted by two surfaces of a stimulable phosphor sheet is carried out, such that an image free of noise and having good image quality may be obtained, it is necessary to detect an abnormal image pattern. Therefore, it is considered to apply the method proposed in U.S. Pat. No. 4,920,267 or 5,231,574.

However, with the operation for detecting light emitted by two surfaces of a stimulable phosphor sheet, two image signals are obtained respectively from the two surfaces of the stimulable phosphor sheet. Therefore, it is necessary for the operation for detecting an abnormal image pattern to be carried out two times for a single radiation image stored on the stimulable phosphor sheet. Accordingly, considerable time and labor are required to detect an abnormal image pattern and to carry out the processes for eliminating noise due to the abnormal image pattern.

SUMMARY OF THE INVENTION

The primary object of the present invention is to provide a method for detecting an abnormal image pattern wherein, in cases where an operation for detecting light emitted by two surfaces of a stimulable phosphor sheet, on which a radiation image has been stored, is carried out, the features of such an operation are utilized, and an abnormal image pattern is detected easily.

Another object of the present invention is to provide an apparatus for carrying out the method for detecting an abnormal image pattern.

The present invention provides a method for detecting an abnormal image pattern in a radiation image read-out operation, wherein a stimulable phosphor sheet, on which a radiation image has been stored, is exposed to stimulating rays, which cause the stimulable phosphor sheet to emit light in proportion to the amount of energy stored thereon during its exposure to radiation, the light, which is emitted by one of the two surfaces of the stimulable phosphor sheet during the scanning of the stimulable phosphor sheet with the stimulating rays, and the light, which is emitted by the other surface of the stimulable phosphor sheet during the scanning of the stimulable phosphor sheet with the stimulating rays, are respectively detected photoelectrically, two image signals are thereby obtained, each of the two image signals being made up of a series of image signalcomponents representing picture elements, and the two image signals are then added to each other, an addition image signal, which represents the radiation image, being thereby obtained, the method comprising the steps of:

i) subtracting the image signal components of the two image signals from each other, which image signal components represent corresponding picture elements on one of the two surfaces of the stimulable phosphor sheet and the other surface of the stimulable phosphor sheet, difference values being thereby obtained, ii) making a judgment as to whether each of the difference values falls or does not fall within a predetermined range, and iii) in cases where a difference value is judged as being outside the predetermined range, determining that an abnormal signal component is contained in at least either one of the two image signals.

The present invention also provides an apparatus for detecting an abnormal image pattern in a radiation image read-out operation, wherein a stimulable phosphor sheet, on which a radiation image has been stored, is exposed to stimulating rays, which cause the stimulable phosphor sheet to emit light in proportion to the amount of energy stored thereon during its exposure to radiation, the light, which is emitted by one of the two surfaces of the stimulable phosphor sheet during the scanning of the stimulable phosphor sheet with the stimulating rays, and the light, which is emitted by the other surface of the stimulable phosphor sheet during the scanning of the stimulable phosphor sheet with the stimulating rays, are respectively detected photoelectrically, two image signals are thereby obtained, each of the two image signals being made up of a series of image signal components representing picture elements, and the two image signals are then added to each other, an addition image signal, which represents the radiation image, being thereby obtained, the apparatus comprising:

i) a difference value calculating means for subtracting the image signal components of the two image signals from each other, which image signal components represent corresponding picture elements on one of the two surfaces of the stimulable phosphor sheet and the other surface of the stimulable phosphor sheet, difference values being thereby obtained, and ii) a judgment means, which makes a judgment as to whether each of the difference values falls or does not fall within a predetermined range and which, in cases where a difference value is judged as being outside the predetermined range, determines that an abnormal signal component is contained in at least either one of the two image signals.

In the method and apparatus for detecting an abnormal image pattern in accordance with the present invention, in cases where it has been determined that an abnormal signal component is contained in at least either one of the two image signals, information representing the position at which an abnormal picture element represented by the abnormal signal component is located, should preferably be fed into an image processing means, which carries out image processing on each of the two image signals or on the addition image signal.

Also, in the image processing means, the signal value of the abnormal picture element should preferably be compensated for in accordance with the signal value of the corresponding picture element on the surface of the stimulable phosphor sheet opposite to the surface, from which the image signal containing the abnormal signal component has been obtained.

Alternatively, in the image processing means, the signal value of the abnormal picture element should preferably be compensated for in accordance with signal values of picture elements located in the vicinity of the abnormal picture element.

In the method and apparatus for detecting an abnormal image pattern in accordance with the present invention, the operation for detecting light emitted by two surfaces of a stimulable phosphor sheet is carried out, and the two image signals are obtained respectively from the two surfaces of the stimulable phosphor sheet. Thereafter, the difference value is obtained by subtracting the image signal components of the two image signals from each other, which image signal components represent corresponding picture elements on the front surface and the back surface of the stimulable phosphor sheet. Ordinarily, the difference values, which are thus obtained, become approximately equal to a predetermined value. However, if dust, or the like, is located on one of the surfaces of the stimulable phosphor sheet, the picture element corresponding to the portion, at which dust, or the like, is located, will take an abnormal signal value. In such cases, the difference value obtained by subtracting the image signal components, which represent the abnormal picture element on the aforesaid one surface of the stimulable phosphor sheet and the corresponding picture element on the other surface of the stimulable phosphor sheet, will become different from the difference values between the other corresponding picture elements.

The method and apparatus for detecting an abnormal image pattern in accordance with the present invention are based on such findings are used in the technique for detecting light emitted by two surfaces of a stimulable phosphor sheet. With the method and apparatus for detecting an abnormal image pattern in accordance with the present invention, the two image signals, which have been obtained respectively from the two surfaces of the stimulable phosphor sheet, are subtracted from each other, and the difference values are thereby obtained. In cases where a difference value is judged as being outside a certain predetermined range, it is determined that an abnormal signal component is contained in at least either one of the two image signals. In this manner, with the method and apparatus for detecting an abnormal image pattern in accordance with the present invention, an abnormal image pattern is detected by using the two image signals, which have been obtained from the operation for detecting light emitted by two surfaces of a stimulable phosphor sheet. Therefore, in cases where the operation for detecting light emitted by two surfaces of a stimulable phosphor sheet is carried out, an abnormal image pattern can be detected accurately and with a simple constitution.

Also, in cases where it has been determined that an abnormal signal component is contained in at least either one of the two image signals, information representing the position, at which the abnormal picture element represented by the abnormal signal component is located, should preferably be fed into the image processing means, which carries out image processing. In such cases, in the image processing means, the image processing can be carried out such that the position of the abnormal picture element may be taken into consideration, and such that the abnormal signal component representing the abnormal picture element may be compensated for with a correct image signal components.

DESCRIPTION OF THE PREFERRED EMBODIMENTS

The present invention will hereinbelow be described in further detail with reference to the accompanying drawings.

Figure 1:
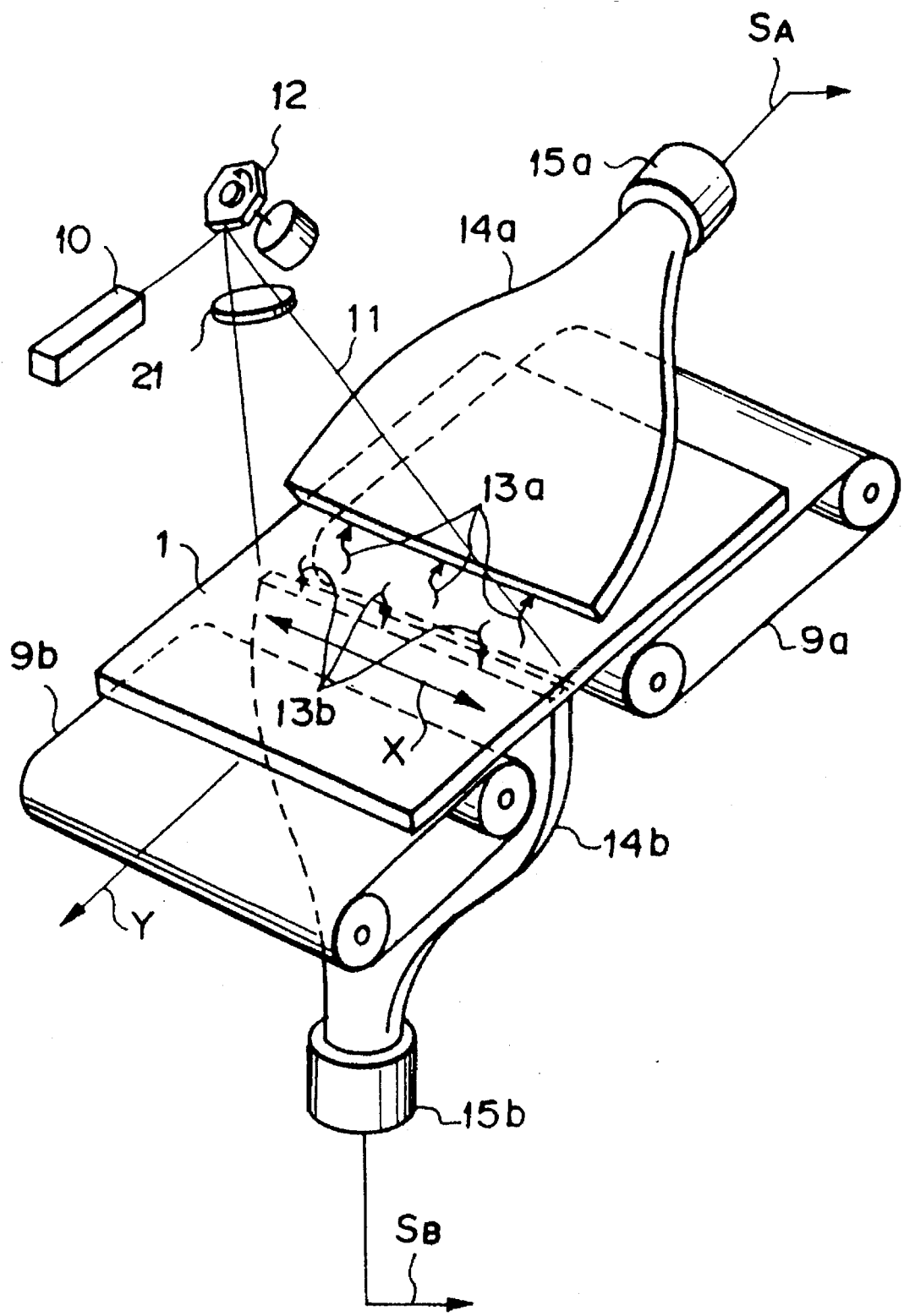
FIG. 1 is a perspective view showing an example of a radiation image read-out apparatus, which carries out an operation for detecting light emitted by two surfaces of a stimulable phosphor sheet.

FIG. 1 is a perspective view showing an example of a radiation image read-out apparatus, which carries out an operation for detecting light emitted by two surfaces of a stimulable phosphor sheet.

With reference to FIG. 1, a stimulable phosphor sheet 1 is placed on endless belts 9a and 9b. The endless belts 9a and 9b are rotated by motors (not shown). A laser beam source 10, a rotating polygon mirror 12, and a scanning lens 21 are located above the stimulable phosphor sheet 1. The laser beam source 10 produces a laser beam 11 serving as stimulating rays, which cause the stimulable phosphor sheet 1 to emit light in proportion to the amount of energy stored thereon during its exposure to the radiation. The rotating polygon mirror 12 reflects, and deflects the laser beam 11, which has been produced by the laser beam source 10, such that the laser beam 11 may scan the stimulable phosphor sheet 1 in main scanning directions. The rotating polygon mirror 12 is rotated by a motor (not shown). The scanning lens 21 converges the laser beam 11, which has been reflected and deflected by the rotating polygon mirror 12, on the stimulable phosphor sheet 1 and causes the laser beam 11 to scan the stimulable phosphor sheet 1 at uniform speed. A light guide member 14a is located above and close to the position on the stimulable phosphor sheet 1, which is being scanned with the laser beam 11. The light guide member 14a collects light, which is emitted by the stimulable phosphor sheet 1 when it is scanned with the laser beam 11, from above the stimulable phosphor sheet 1. Also, a light guide member 14b is located below the position on the stimulable phosphor sheet 1, which is being scanned with the laser beam 11. The light guide member 14b is located perpendicularly to the stimulable phosphor sheet 1 and collects the light, which is emitted by the stimulable phosphor sheet 1 when it is scanned with the laser beam 11, from below the stimulable phosphor sheet 1. The light guide members 14a and 14b are located such that they may respectively be in close contact with photo multipliers 15a and 15b, which photoelectrically detect the light emitted by the stimulable phosphor sheet 1. The stimulable phosphor sheet 1, on which the radiation image has been stored, is set at a predetermined position on the endless belts 9a and 9b. The stimulable phosphor sheet 1, which has been set at the predetermined position, is conveyed by the endless belts 9a and 9b in a sub-scanning direction indicated by the arrow Y. Also, the laser beam 11 is produced by the laser beam source 10. The laser beam 11, which has been produced by the laser beam source 10, is reflected and deflected by the rotating polygon mirror 12, which is driven by a motor (not shown) and is rotated quickly in the direction indicated by the arrow. The laser beam 11, which has thus been reflected and deflected by the rotating polygon mirror 12, impinges upon the stimulable phosphor sheet 1 and scans it in the main scanning directions indicated by the double headed arrow X. The main scanning directions are approximately normal to the sub-scanning direction indicated by the arrow Y. When the stimulable phosphor sheet 1 is exposed to the laser beam 11, the exposed portion of the stimulable phosphor sheet 1 emits light in proportion to the amount of energy stored thereon during its exposure to the radiation. The light, which is emitted upwardly by the stimulable phosphor sheet 1, is represented by reference numeral 13a. The light, which is emitted downwardly by the stimulable phosphor sheet 1, is represented by reference numeral 13b. The emitted light 13a is guided by the light guide member 14a and photoelectrically detected by the photomultiplier 15a. The emitted light 13a, which has entered from the input end face of the light guide member 14a into the light guide member 14a, is guided through repeated total reflection inside of the light guide member 14a, emanates from the output end face of the light guide member 14a, and is received by the photomultiplier 15a. The amount of the emitted light 13a representing the radiation image is converted by the photomultiplier 15a into an electric signal. In the same manner as that described above, the emitted light 13b is guided by the light guide member 14b and is photoelectrically detected by the photomultiplier 15b.

The photomultiplier 15a generates an analog output signal $S_A$. Also, the photomultiplier 15b generates an analog output signal $S_B$. An operation for detecting an abnormal image pattern is carried out in the manner described below by using the analog output signals $S_A$ and $S_B$.

Figure 2:
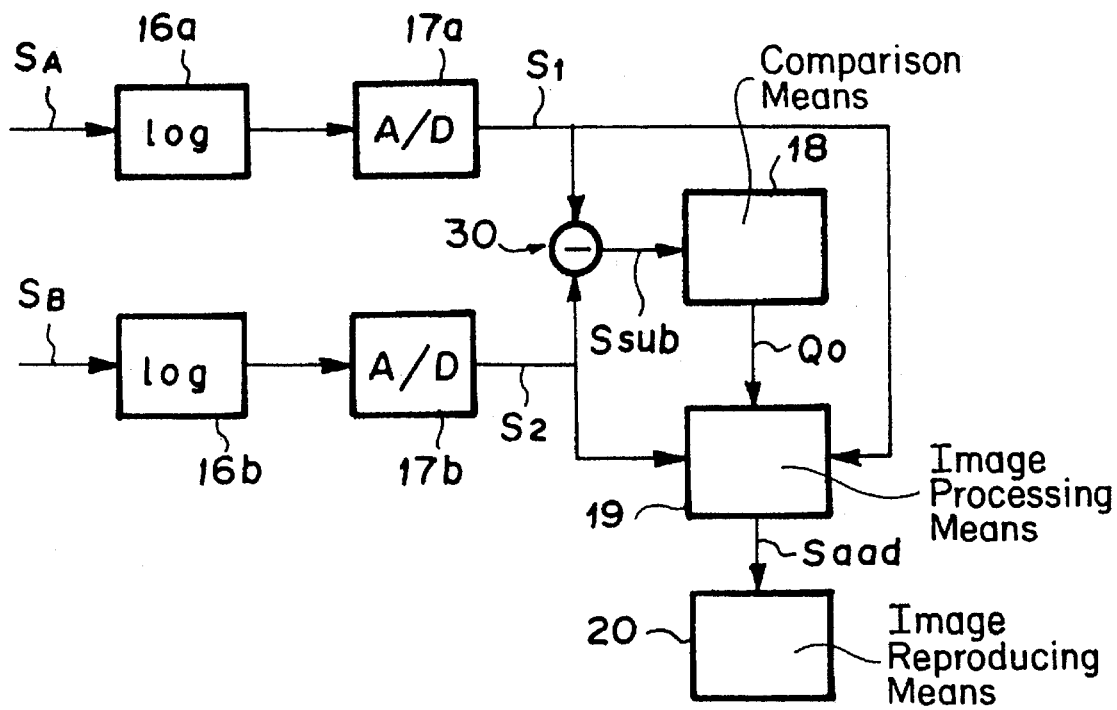
FIG. 2 is a block diagram showing an embodiment of the apparatus for detecting an abnormal image pattern in accordance with the present invention.

FIG. 2 is a block diagram showing an embodiment of the apparatus for detecting an abnormal image pattern in accordance with the present invention.

With reference to FIG. 2, the analog output signal $S_A$, which has been obtained from the front surface of the stimulable phosphor sheet 1, is logarithmically amplified by a logarithmic amplifier 16a and converted into a digital image signal $S_1$ by an analog-to-digital converter 17a. Also, the analog output signal $S_B$, which has been obtained from the back surface of the stimulable phosphor sheet 1, is logarithmically amplified by a logarithmic amplifier 16b and converted into a digital image signal $S_2$ by an analog-to-digital converter 17b. The image signals $S_1$ and $S_2$ are then fed into a subtraction means 30. In the subtraction means 30, image signal components of the image signals $S_1$ and $S_2$ are subtracted from each other, which image signal components represent corresponding picture elements on the front surface and the back surface of the stimulable phosphor sheet 1. In this manner, difference values $S_{sub}$ are obtained. Information representing the difference values $S_{sub}$, which have been obtained in the subtraction means 30, is fed into a comparison means 18. The comparison means 18 carries out the processes described below. The image signals $S_1$ and $S_2$ are also fed into an image processing means 19, which will be described later.

Figure 3:
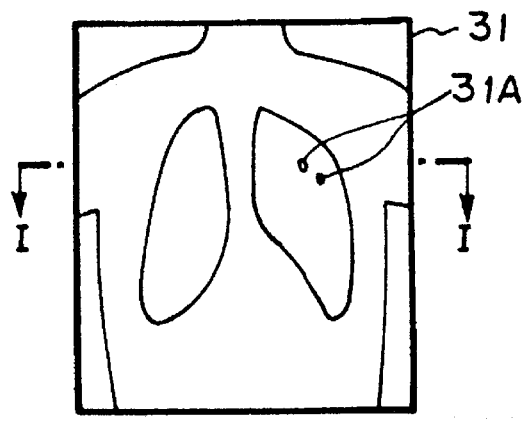
FIG. 3 is an explanatory view showing an example of an abnormal image pattern.
Figure 4A:
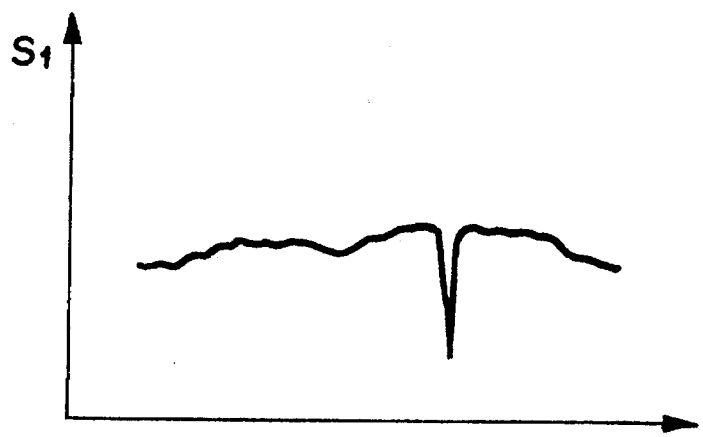
FIG. 4A is a graph showing a profile of an image signal, which has been obtained from one of the surfaces of a stimulable phosphor sheet and contains an abnormal signal component representing an abnormal image pattern.
Figure 4B:
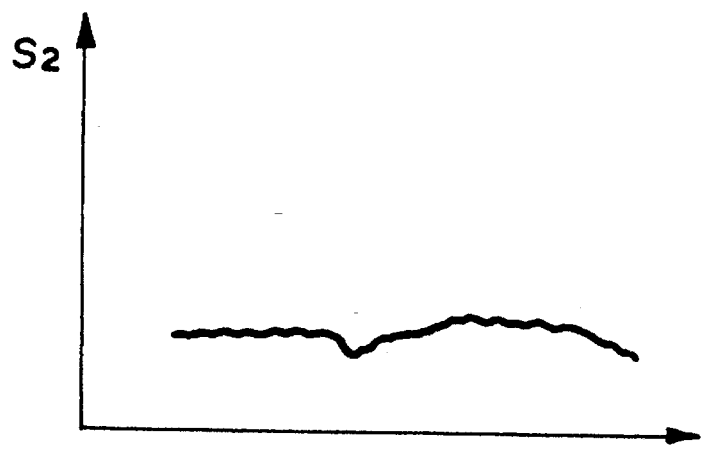
FIG. 4B is a graph showing a profile of an image signal, which has been obtained from the other surface of the stimulable phosphor sheet and contains no an abnormal signal component.

By way of example, as illustrated in FIG. 3, a radiation image 31 of the chest of a human body is stored on the stimulable phosphor sheet. Also, white dot-like patterns 31A, 31A occur in the lung field pattern due to dust which clings to the front surface of the stimulable phosphor sheet 1, flaws on the front surface of the stimulable phosphor sheet 1, dust which clings to the photomultiplier 15a, or the like. In such cases, the profile of the image signal $S_1$ along the line I—I of FIG. 3 becomes as shown in FIG. 4A. Also, the profile of the image signal $S_2$ along the line I—I of FIG. 3 becomes as shown in FIG. 4B. Specifically, as illustrated in FIG. 4A, a portion, at which the image signal value changes largely, is contained in the profile of the image signal $S_1$, which has been obtained from the front surface side of the stimulable phosphor sheet 1.

Figure 4C:
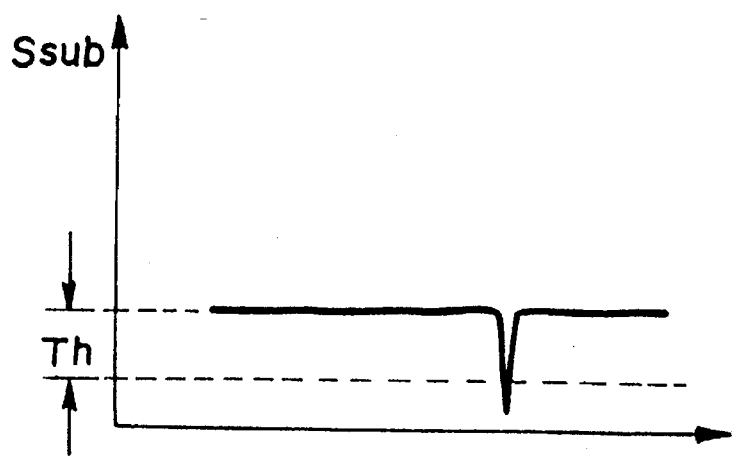
FIG. 4C is a graph showing a profile of difference values obtained by subtracting the image signals shown in FIGS. 4A and 4B from each other.

During the radiation image recording operation, radiation was irradiated to the front surface side of the stimulable phosphor sheet 1. Also, during the radiation image read-out operation, the laser beam 11 was irradiated to the front surface side of the stimulable phosphor sheet 1. Therefore, the image signal $S_1$, which has been obtained from the front surface side of the stimulable phosphor sheet 1, takes values larger than the values of the image signal $S_2$, which has been obtained from the back surface side of the stimulable phosphor sheet 1. If the portion, at which the image signal value changes largely as illustrated in FIG. 4A, is not contained in the image signal $S_1$, the difference values $S_{sub}$ between the image signals $S_1$ and $S_2$ will become equal to a predetermined value. However, as illustrated in FIG. 4A, the image signal $S_1$ contains the portion, at which the image signal value changes largely due to dust clinging to the front surface of the stimulable phosphor sheet 1, or the like. Therefore, as illustrated in FIG. 4C, the profile of the difference values $S_{sub}$ between the image signals $S_1$ and $S_2$ is composed of the portion, at which the difference values $S_{sub}$ are approximately equal to a predetermined value, and the portion, at which the difference values $S_{sub}$ change largely.

Therefore, in the comparison means 18, a judgment is made as to whether each of the difference values $S_{sub}$ falls or does not fall within a predetermined range. In cases where a difference value $S_{sub}$ is judged as going beyond a threshold value Th, it is determined that an abnormal signal component due to dust clinging to the surface of the stimulable phosphor sheet 1, or the like, is contained in at least either one of the image signals $S_1$ and $S_2$. In such cases, the comparison means 18 feeds information $Q_0$, which represents the position of the abnormal picture element represented by the abnormal signal component, into the image processing means 19, which will be described below.

In the image processing means 19, in accordance with the position information $Q_0$, differentiation processing is carried out on the signal values of each of the image signals $S_1$ and $S_2$, which signal values correspond to picture elements located in the vicinity of the abnormal picture element. In cases where the differentiation processing is carried out in this manner, the values resulting from the differentiation processing become large at the portion, at which the signal value corresponding to a certain picture element changes largely from the signal values corresponding to the picture elements in the vicinity of the certain picture element. In the image processing means 19, the values resulting from the differentiation processing, which has been carried out on the image signal $S_1$, and the values resulting from the differentiation processing, which has been carried out on the image signal $S_2$, are compared with each other. In this manner, a judgment is made as to whether the abnormal signal component is contained in the image signal $S_1$, which has been obtained from the front surface of the stimulable phosphor sheet 1, or in the image signal $S_2$, which has been obtained from the back surface of the stimulable phosphor sheet 1. In this embodiment, the image signal $S_1$, which has the profile shown in FIG. 4A, and the image signal $S_2$, which has the profile shown in FIG. 4B, are obtained, and the value resulting from the differentiation processing becomes large at the abnormal picture element, which is represented by the abnormal signal component of the image signal $S_1$. Therefore, it is determined that the abnormal signal component is contained in the image signal $S_1$.

Figure 5:
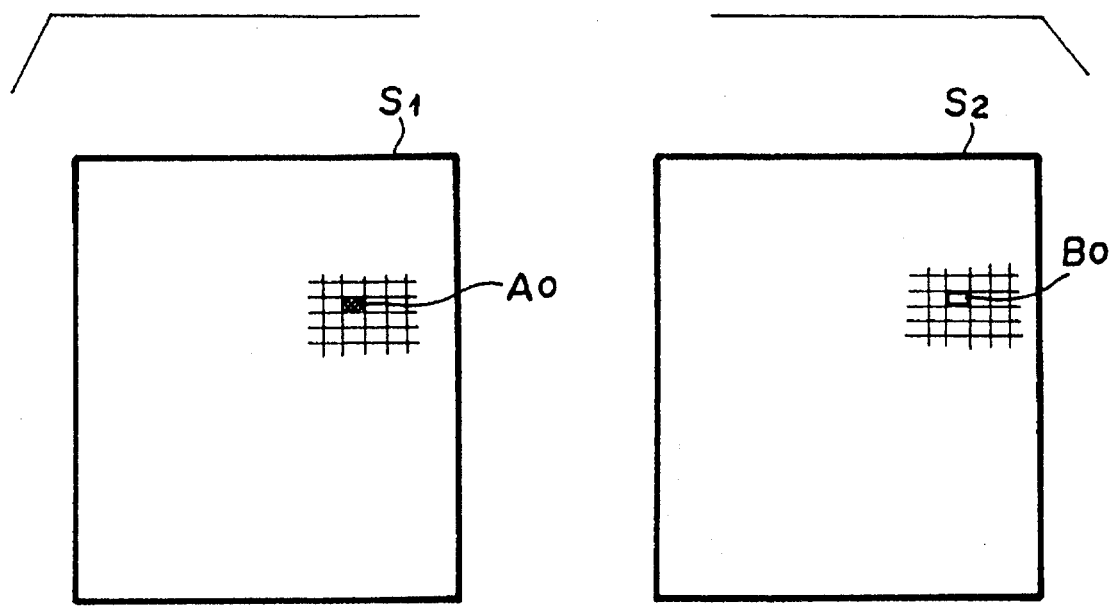
FIG. 5 is an explanatory view showing an example of how an abnormal picture element is compensated for, FIG. 6 is an explanatory view showing a different example of how an abnormal picture element is compensated for, FIG. 7 is a block diagram showing a different embodiment of the apparatus for detecting an abnormal image pattern in accordance with the present invention.

Thereafter, in the image processing means 19, the value of the abnormal signal component of the image signal $S_1$, which represents the abnormal picture element, is compensated for in accordance with the value of the image signal component of the image signal $S_2$, which image signal component represents the picture element corresponding to the abnormal picture element. Specifically, as illustrated in FIG. 5, the value of the abnormal signal component of the image signal $S_1$, which represents an abnormal picture element $A_0$ (hatched in FIG. 5), is replaced by the value of the image signal component of the image signal $S_2$, which image signal component represents a picture element $B_0$ (enclosed in a bold-line frame) corresponding to the abnormal picture element $A_0$. In this manner, the signal value corresponding to the abnormal picture element is compensated for. The level of the image signal $S_2$ is lower than the level of the image signal $S_1$. Therefore, a predetermined value (for example, the value at the portion of the profile of the difference values $S_{sub}$ shown in FIG. 4C, at which the difference values $S_{sub}$ are constant) is added to the value of the image signal component of the image signal $S_2$, which image signal component represents the picture element $B_0$ corresponding to the abnormal picture element $A_0$. Thereafter, the value of the abnormal signal component of the image signal $S_1$, which represents the abnormal picture element $A_0$, is replaced by the sum obtained in this manner. In the image processing means 19, after the signal value corresponding to the abnormal picture element has been compensated for in the manner described above, the image signal $S_1$ and the image signal $S_2$ are added to each other, and an addition image signal $S_{add}$ is thereby obtained. The addition image signal $S_{add}$ is then subjected to predetermined image processing and fed into an image reproducing means 20, which may be constituted of a laser printer, a cathode ray tube (CRT) display device, or the like. In the image reproducing means 20, the addition image signal $S_{add}$ is used for reproducing a visible image.

The addition image signal $S_{add}$ obtained in the manner described above does not contain noise due to dust clinging to the surface of the stimulable phosphor sheet 1, or the like. Therefore, a visible image free of noise and having good image quality can be reproduced by the image reproducing means 20.

Figure 6:
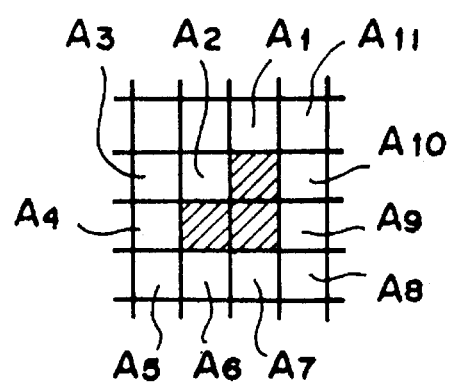

In the embodiment described above, the value of the abnormal signal component of the image signal $S_1$, which represents the abnormal picture element, is compensated for in accordance with the value of the image signal component of the image signal $S_2$, which image signal component represents the picture element corresponding to the abnormal picture element. Alternatively, as illustrated in FIG. 6, the mean value of the values of the image signal components, which represent picture elements $A_1$ through $A_{11}$ surrounding abnormal picture elements (hatched in FIG. 6), may be calculated. The signal values corresponding to the abnormal picture elements may then be compensated for in accordance with the mean value, which has thus been calculated. As another alternative, the signal value representing an abnormal picture element may be replaced directly by the signal value corresponding to a picture element, which is adjacent to the abnormal picture element.

Figure 7:
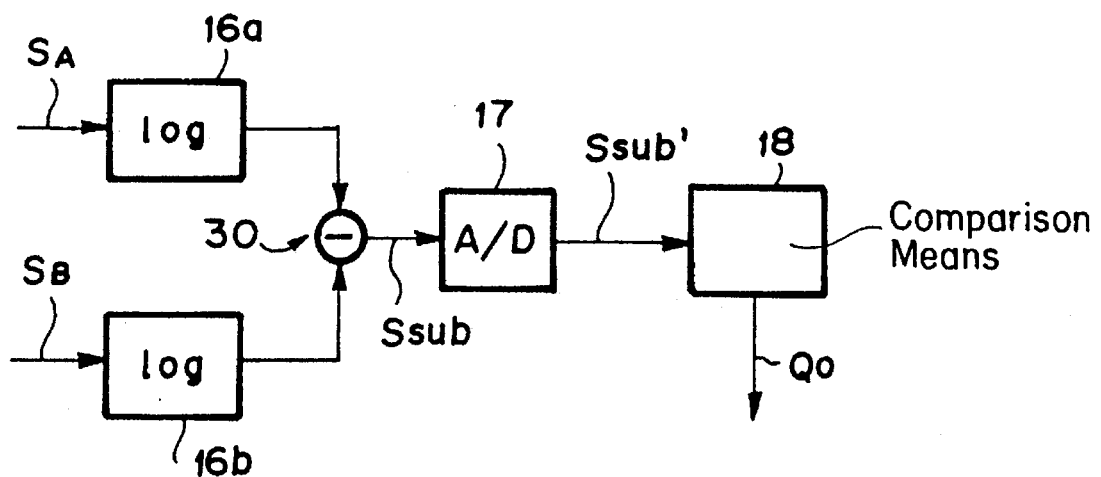

Also, in the embodiment described above, the difference values $S_{sub}$ are calculated by subtracting the image signals $S_1$ and $S_2$ from each other, which have been digitized by the analog-to-digital converters 17a and 17b, and the detection of an abnormal image pattern is carried out in accordance with the difference values $S_{sub}$. Alternatively, for example, as illustrated in FIG. 7, in the subtraction means 30, difference values $S_{sub}$ may be calculated by subtracting the output signals $S_A$ and $S_B$ from each other, which have been obtained from the logarithmic conversion carried out by the logarithmic converters 16a and 16b. Thereafter, a difference signal representing the difference values $S_{sub}$, which have thus been calculated, may be converted by an analog-to-digital converter 17 into a digital signal representing difference values $S_{sub}'$. The digital signal representing difference values $S_{sub}'$ may then be fed into the comparison means 18 and used in determining whether an abnormal image pattern is or is not contained in the output signal $S_A$ or the output signal $S_B$.

Figure 8:
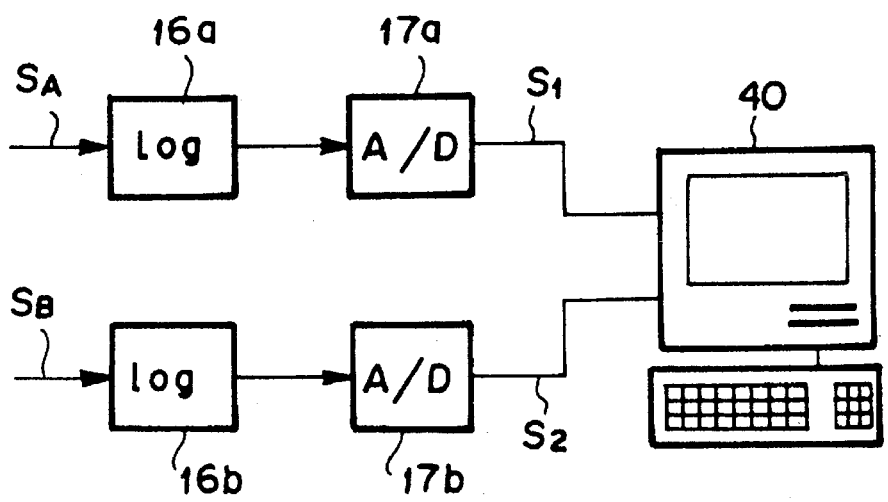
FIG. 8 is a block diagram showing a further different embodiment of the apparatus for detecting an abnormal image pattern in accordance with the present invention.

As another alternative, as illustrated in FIG. 8, the image signals $S_1$ and $S_2$ may be fed into a computer 40. With the software in the computer 40, the calculation of the difference values, the comparison of the difference values with the predetermined value, and the judgment as to an abnormal image pattern may be carried out in the manner described above.

Figure 9:
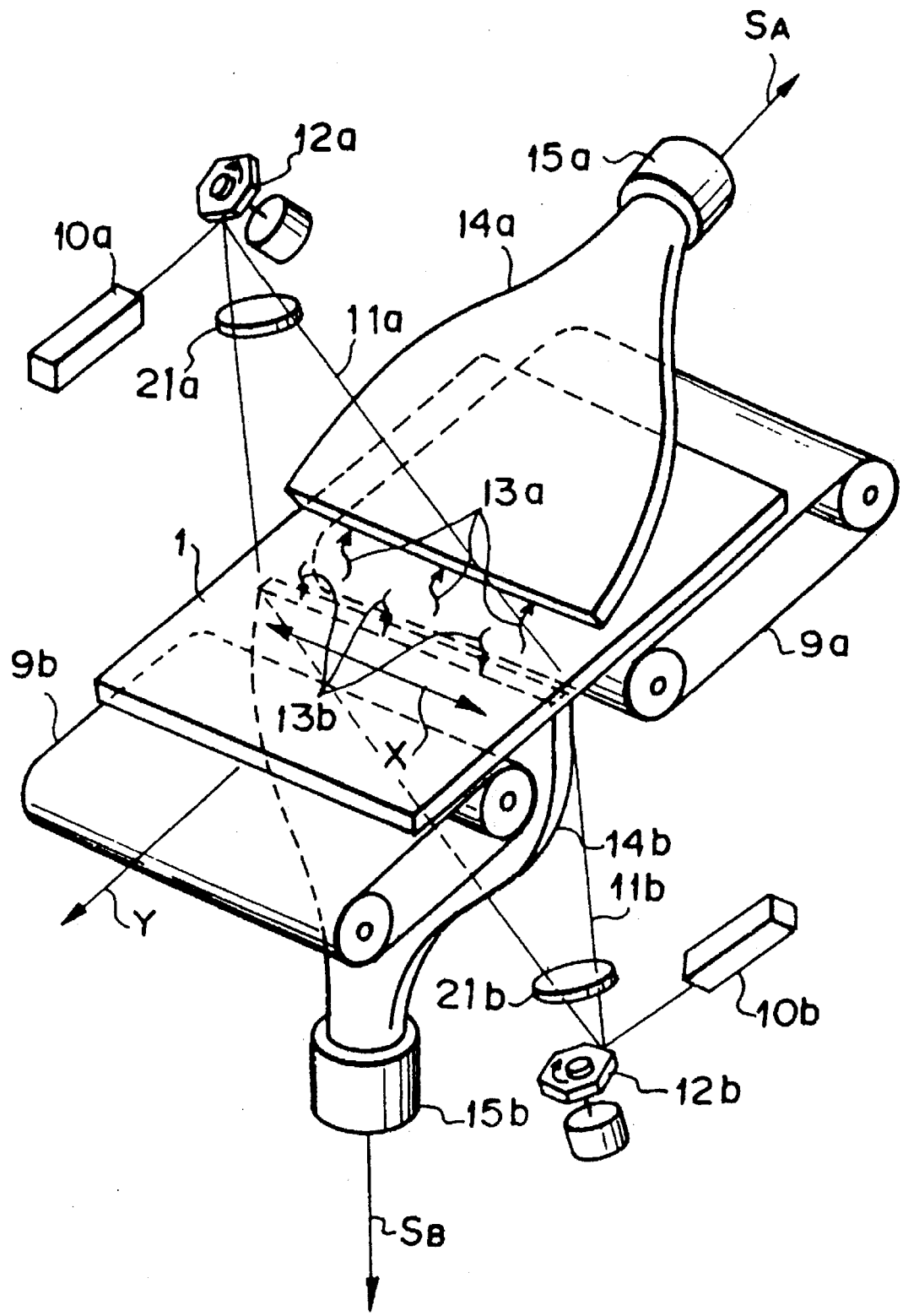
FIG. 9 is a perspective view showing a different example of a radiation image read-out apparatus, which carries out an operation for detecting light emitted by two surfaces of a stimulable phosphor sheet.

In the operation for detecting the light emitted by the two surfaces of the stimulable phosphor sheet, the stimulable phosphor sheet 1 is scanned with the laser beam 11, which has been produced by the single laser beam source 10. Alternatively, as illustrated in FIG. 9, a laser beam source 10a, a rotating polygon mirror 12a, and a scanning lens 21a may be located on the front surface side of the stimulable phosphor sheet 1. Also, a laser beam source 10b, a rotating polygon mirror 12b, and a scanning lens 21b may be located on the back surface side of the stimulable phosphor sheet 1. The two surfaces of the stimulable phosphor sheet 1 may be scanned respectively with laser beams 11a and 11b, which have been produced by the laser beam sources 10a and 10b. The light emitted by the two surfaces of the stimulable phosphor sheet 1 may thus be detected, and two image signals may thereby be obtained.

What is claimed is:

1. A method for detecting an abnormal image pattern in a radiation image read-out operation, wherein a stimulable phosphor sheet, on which a radiation image has been stored, is exposed to stimulating rays, which cause the stimulable phosphor sheet to emit light in proportion to the amount of energy stored thereon during its exposure to radiation, the light, which is emitted by one of the two surfaces of the stimulable phosphor sheet during the scanning of the stimulable phosphor sheet with the stimulating rays, and the light, which is emitted by the other surface of the stimulable phosphor sheet during the scanning of the stimulable phosphor sheet with the stimulating rays, are respectively detected photoelectrically, two image signals are thereby obtained, each of the two image signals being made up of a series of image signal components representing picture elements, and the two image signals are then added to each other, an addition image signal, which represents the radiation image, being thereby obtained, the method comprising the steps of:

i) subtracting the image signal components of the two image signals from each other, which image signal components represent corresponding picture elements on one of the two surfaces of the stimulable phosphor sheet and the other surface of the stimulable phosphor sheet, difference values being thereby obtained, ii) making a judgment as to whether each of the difference values falls or does not fall within a predetermined range, and iii) in cases where a difference value is judged as being outside the predetermined range, determining that an abnormal signal component is contained in at least either one of the two image signals.

2. A method as defined in claim 1 wherein, in cases where it has been determined that an abnormal signal component is contained in at least either one of the two image signals, information representing the position, at which an abnormal picture element represented by said abnormal signal component is located, is fed into an image processing means, which carries out image processing on each of the two image signals or on the addition image signal.

3. A method as defined in claim 2 wherein, in said image processing means, the signal value of said abnormal picture element is compensated for in accordance with the signal value of the corresponding picture element on the surface of the stimulable phosphor sheet opposite to the surface, from which the image signal containing said abnormal signal component has been obtained.

4. A method as defined in claim 2 wherein, in said image processing means, the signal value of said abnormal picture element is compensated for in accordance with signal values of picture elements located in the vicinity of said abnormal picture element.

5. An apparatus for detecting an abnormal image pattern in a radiation image read-out operation, wherein a stimulable phosphor sheet, on which a radiation image has been stored, is exposed to stimulating rays, which cause the stimulable phosphor sheet to emit light in proportion to the amount of energy stored thereon during its exposure to radiation, the light, which is emitted by one of the two surfaces of the stimulable phosphor sheet during the scanning of the stimulable phosphor sheet with the stimulating rays, and the light, which is emitted by the other surface of the stimulable phosphor sheet during the scanning of the stimulable phosphor sheet with the stimulating rays, are respectively detected photoelectrically, two image signals are thereby obtained, each of the two image signals being made up of a series of image signal components representing picture elements, and the two image signals are then added to each other, an addition image signal, which represents the radiation image, being thereby obtained, the apparatus comprising:

i) a difference value calculating means for subtracting the image signal components of the two image signals from each other, which image signal components represent corresponding picture elements on one of the two surfaces of the stimulable phosphor sheet and the other surface of the stimulable phosphor sheet, difference values being thereby obtained, and ii) a judgment means, which makes a judgment as to whether each of the difference values falls or does not fall within a predetermined range and which, in cases where a difference value is judged as being outside the predetermined range, determines that an abnormal signal component is contained in at least either one of the two image signals.

6. An apparatus as defined in claim 5 further comprising a position information output means serving such that, in cases where it has been determined that an abnormal signal component is contained in at least either one of the two image signals, said position information output means may feed information representing the position, at which an abnormal picture element represented by said abnormal signal component is located, into an image processing means, which carries out image processing on each of the two image signals or on the addition image signal.

7. An apparatus as defined in claim 6 wherein said image processing means carries out image processing such that the signal value of said abnormal picture element may be compensated for in accordance with the signal value of the corresponding picture element on the surface of the stimulable phosphor sheet opposite to the surface, from which the image signal containing said abnormal signal component has been obtained.

8. An apparatus as defined in claim 6 wherein said image processing means carries out image processing such that the signal value of said abnormal picture element may be compensated for in accordance with signal values of picture elements located in the vicinity of said abnormal picture element.

* * * * *